US 11,423,777 B2

(12) United States Patent
Hata et al.

(10) Patent No.: US 11,423,777 B2
(45) Date of Patent: Aug. 23, 2022

(54) TRAFFIC SIGN DISPLAYING DEVICE

(71) Applicant: HONDA MOTOR CO., LTD., Tokyo (JP)

(72) Inventors: Naoya Hata, Wako (JP); Toshinori Saiki, Wako (JP); Yuji Yokochi, Wako (JP); Naoto Akutsu, Wako (JP); Hiroyuki Sakakibara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/211,084

(22) Filed: Mar. 24, 2021

(65) Prior Publication Data
US 2021/0304598 A1  Sep. 30, 2021

(30) Foreign Application Priority Data
Mar. 30, 2020 (JP) .............................. JP2020-059880

(51) Int. Cl.
*G08G 1/09* (2006.01)
*G08G 1/0962* (2006.01)
*G06V 20/58* (2022.01)

(52) U.S. Cl.
CPC ....... *G08G 1/09623* (2013.01); *G06V 20/582* (2022.01); *G08G 1/09626* (2013.01)

(58) Field of Classification Search
CPC ........... G08G 1/09623; G08G 1/09626; G08G 1/096725; G08G 1/052; G08G 1/095; G06V 20/582; G06K 9/6201
See application file for complete search history.

(56) References Cited

U.S. PATENT DOCUMENTS

| 2016/0117922 A1* | 4/2016 | Oh ...................... G01C 21/3691 |
| | | 348/118 |
| 2017/0092125 A1* | 3/2017 | Fujimaki ............. G08G 1/09626 |
| 2017/0148320 A1* | 5/2017 | Ro ...................... G08G 1/09623 |

FOREIGN PATENT DOCUMENTS

| JP | 2017-045194 A | | 3/2017 | |
| JP | 2017062696 A | * | 3/2017 | ......... G01C 21/3492 |

* cited by examiner

*Primary Examiner* — Brian Wilson
(74) *Attorney, Agent, or Firm* — Rankin, Hill & Clark LLP (57) ABSTRACT

A traffic sign displaying device comprises a processor including a traffic sign recognizing section recognizing first traffic sign information on a traffic sign included in an image of an area ahead of a vehicle, a traffic sign information obtaining section obtaining from map information second traffic sign information on a traffic sign of a road based on position information on the vehicle, a traffic sign display portion displaying traffic sign information and a traffic sign display control section for controlling the traffic sign display portion, wherein if the first traffic sign information does not match the second traffic sign information, the traffic sign display control section stops displaying traffic sign information after the vehicle runs a predetermined distance or over a predetermined time with the traffic sign display control section displaying on the traffic sign display portion either the first traffic sign information or the second traffic sign information.

8 Claims, 8 Drawing Sheets

TRAFFIC SIGN DISPLAYING DEVICE

CROSS REFERENCE TO RELATED APPLICATIONS

This application claims the foreign priority benefit under 35 U.S.C. § 119 of Japanese Patent Application No. 2020-059880 filed on Mar. 30, 2020, the disclosure of which is incorporated herein by reference.

TECHNICAL FIELD OF THE INVENTION

The present invention relates to a traffic sign displaying device.

BACKGROUND OF THE INVENTION

Recently, great progress has been made on automobile vehicle driving assisting technologies, such as a collision mitigating braking system to avoid a collision or reduce the impact of the collision to mitigate a damage when there is a risk of a vehicle colliding with a pedestrian or other vehicle, Adaptive Cruise Control (ACC) to assist the vehicle with autonomously accelerating and decelerating within a preset speed range to run keeping an appropriate vehicle-to-vehicle distance to an ahead-running vehicle, and a traffic sign recognizing function to have a driver notice a traffic sign by showing the traffic sign on a display.

The recent traffic sign recognizing function is able to recognize a traffic sign included in an image taken by a camera of an area located ahead of a vehicle and notify a driver of several pieces of traffic sign information such as "Maximum allowable speed", "Prohibition of out-of-lane running", "Stop" and "Vehicle prohibited from entering".

Since traffic sign information such as speed limit information is used for the autonomous driving of the vehicle and included in map information needed for the autonomous driving, an information amount of the map information used for the autonomous driving has increased. A position of a driver's vehicle, with respect to which the map information is displayed, is obtained from a Global Navigation Satellite System (GNSS).

Speed limit information on "Maximum allowable speed" can be obtained by a method to recognize the maximum allowable speed from a road traffic sign in an image taken by a camera and a method to recognize the maximum allowable speed from the map information. However, when the driver's vehicle is moving into a highway running lane from a joining lane, there is a case in which the right speed restriction information cannot be displayed because there is not the road traffic sign installed along the joining lane, which makes it impossible to recognize any traffic sign for the maximum allowable speed.

In order to take a countermeasure for a situation like this, JP2017-045197A discloses a traffic sign displaying device to have a displaying device display information on the speed limit that is indicated by the road traffic sign when the road traffic sign to indicate the speed limit is recognized and speed limit information is obtained. Then, if there is a difference between a speed limit determined in accordance with the speed limit information obtained anew by a speed limit information receiving section and a speed limit determined in accordance with the speed limit information obtained at a previous time by the speed limit information receiving section while the information on the speed limit indicated by the road traffic sign is being displayed, the traffic sign displaying device changes the displayed information from the information on the speed limit indicated by the road traffic sign to the information on the speed limit determined in accordance with the speed limit information that the speed limit information receiving section obtained anew.

When the driver's vehicle runs into a road where a speed limit is different, the traffic sign displaying device of JP2017-045194A can manage to display a correct speed limit even if the traffic sign indicating the speed limit on the road cannot be recognized.

However, there is a problem that the speed limit information received from the map information could be different from the situation on the road on which the driver's vehicle is running. This problem is not taken into consideration. For instance, there occurs a problem with incorrect speed limit information being displayed if a temporary speed limit is in place due to a road construction, there is a delay in the map information being updated or correct speed limit information cannot be obtained because a road along which the driver's vehicle is running is incorrectly identified due to a position detection error of GNSS.

The present invention is intended to provide a traffic sign displaying device that does not have a problem above mentioned, and smoothly display a traffic sign without displaying an incorrect traffic sign.

SUMMARY OF THE INVENTION

In order to achieve the objective above described, the traffic sign displaying device of the present invention comprises a processor including a traffic sign recognizing section for recognizing first traffic sign information on a traffic sign included in an image of an area ahead of a vehicle, a traffic sign information obtaining section for obtaining from map information second traffic sign information on a traffic sign of a road on which the vehicle is determined to be running based on position information on the vehicle, a traffic sign display portion for displaying either the first traffic sign information recognized by the traffic sign recognizing section or the second traffic sign information obtained by the traffic sign information obtaining section to a passenger in the vehicle, and a traffic sign display control section for controlling the traffic sign display portion to display traffic sign information that is either the first traffic sign information or the second traffic sign information, wherein if the first traffic sign information recognized by the traffic sign recognizing section does not match the second traffic sign information obtained by the traffic sign information obtaining section, the traffic sign display control section stops displaying the traffic sign information on the traffic sign display portion after the vehicle runs a predetermined distance or over a predetermined time with the traffic sign display control section displaying on the traffic sign display portion either the first traffic sign information recognized by the traffic sign recognizing section or the second traffic sign information obtained by the traffic sign information obtaining section.

DETAILED DESCRIPTION OF EMBODIMENT

A traffic sign displaying device of an embodiment is configured as a part of a driving assistance mechanism of a vehicle and is intended to display a traffic sign recognized by the vehicle on a meter panel to have a driver pay attention to the traffic sign. The traffic sign displaying device, whose details are described later, is configured to recognize road traffic signs for restriction, indication and guide that are installed at a road and a road surface traffic indication from an image taken by a camera with which the vehicle is equipped and determine a road along which the vehicle is running with reference to map information to obtain traffic sign information on the road traffic signs for restriction, indication and guide on the road from the map information. Then, the traffic sign displaying device compares the traffic sign recognized from the image taken by the camera with the traffic sign information derived from the map information.

The traffic sign displaying device displays preferentially the traffic sign recognized from the camera image if there is a discrepancy between the results to be compared. The traffic sign displaying device displays the traffic sign it recognizes on a traffic sign display portion of the meter panel and stops displaying the recognized traffic sign on the traffic sign display portion of the meter panel after the vehicle runs a predetermined distance (several hundred meters to one thousand and several hundred meters) or over a predetermined time. To be specific, the traffic sign displaying device deletes the indication of the traffic sign on the traffic sign display portion or shows that the traffic sign on the traffic sign display portion is invalid.

The traffic sign displaying device continues to display the traffic sign until the vehicle runs the predetermined distance or over the predetermined time. Then the traffic sign displaying device deletes the indication of any of the traffic sign information derived from the map information and the traffic sign recognized from the camera image on the traffic sign display portion or shows on the traffic sign display portion that the indication is invalid. As a result, an incorrect traffic sign is prevented from being displayed, which enables having the driver notice only correct traffic signs.

The traffic sign displaying device resumes displaying the traffic sign on the traffic sign display portion of the meter panel if the traffic sign recognized from the camera image matches the traffic sign information derived from the map information or a predetermined condition, such as a vehicle's action of making a turn to the right or the left being taken, is met after displaying the traffic sign on the traffic sign display portion is stopped.

Hereinafter, an embodiment of the disclosure is described in detail with reference to the attached drawings.

Figure 1:
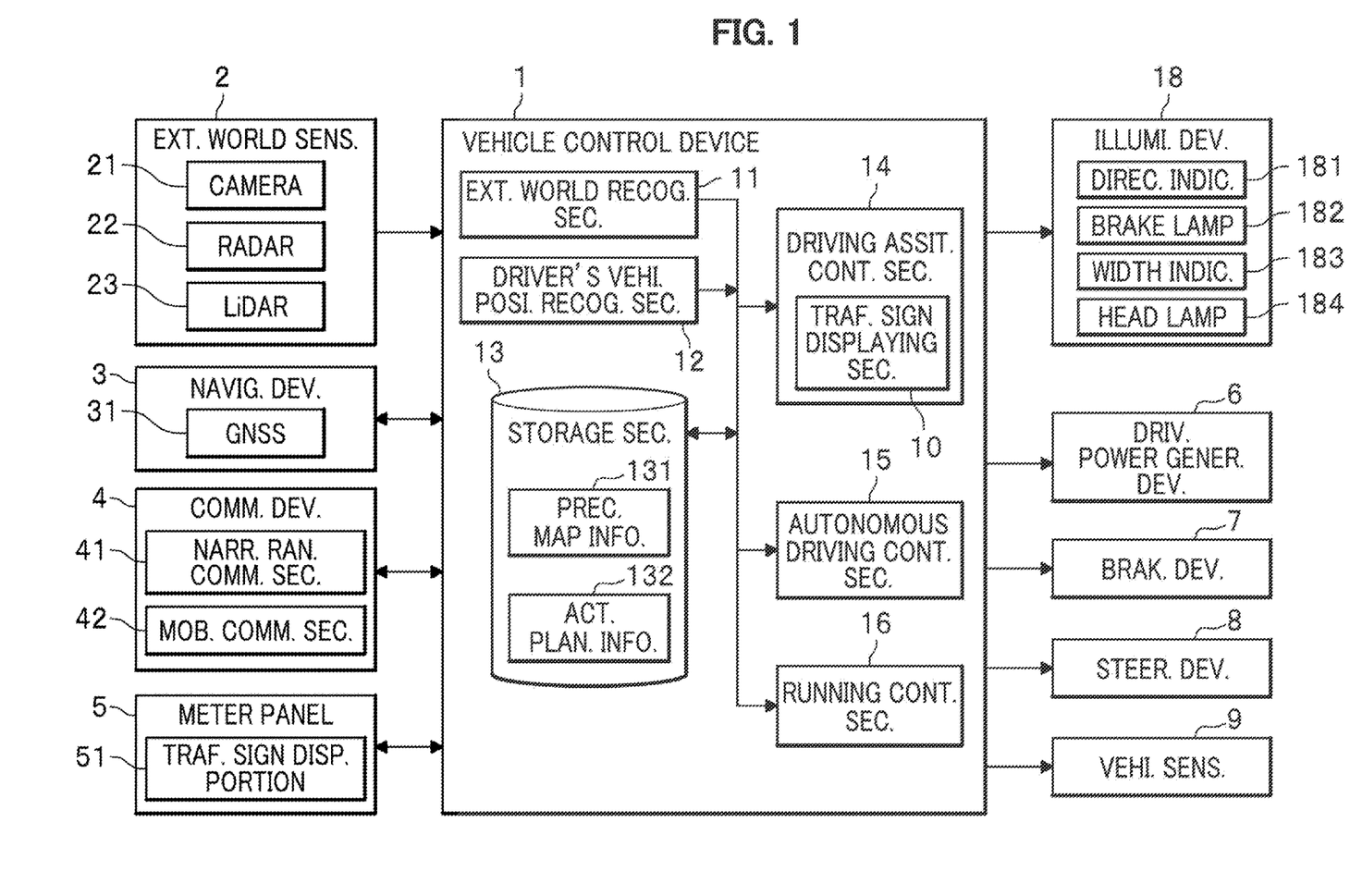
FIG. 1 is a block diagram showing a configuration of a vehicle with a traffic sign displaying device of an embodiment

FIG. 1 shows a configuration of a vehicle equipped with a traffic sign displaying device of the embodiment.

The vehicle equipped with the traffic sign displaying device of the embodiment may be a two-wheel, a three-wheel or a four-wheel vehicle and may be a vehicle driven with an internal combustion engine such as a gasoline engine, an electric vehicle driven with an electric motor, or a hybrid vehicle with both the internal combustion engine and the electric motor The vehicle may comprise a vehicle control device 1, an external world sensor 2, a navigation device 3, a communication device 4, a driving power generating device 6, a braking device 7, a steering device 8, a vehicle sensor 9, an illumination device 18 and a meter panel 5 installed in a vehicle compartment.

The external world sensor 2, the navigation device 3, the communication device 4, the driving power generating device 6, the braking device 7, the steering device 8, the vehicle sensor 9, the illumination device 18 and the meter panel 5 are connected with and are able to communicate data with the vehicle control device 1 through a communication medium.

The external world sensor 2 may have a function of detecting external world information on indicative objects including an object and a traffic sign both of which are present around the vehicle and may include a camera 21, a radar 22 and a LiDAR 23.

The camera 21 may be a CMOS camera or a CCD camera and may have a function of taking an image of an area around the vehicle. The images, which are regularly and repeatedly taken by the camera 21 of an area frontward of the vehicle, an area on the right side of and rearward of vehicle and an area on the left side of and rearward of the vehicle, are sent to an external world recognizing section 11 to be described later.

The radar 22 may have a function of emitting a radar wave to the indicative objects including an ahead-positioned vehicle and receiving the radar wave that reflects from the indicative objects to obtain distribution information on the indicative objects including directions of and distances to the indicative objects. The radar wave to be used may be a laser, a microwave, a millimeter wave or an ultrasonic wave.

The vehicle can measure a distance to a vehicle ahead and a distance to a vehicle behind with the radar 22.

The LiDAR (Light Detection and Ranging) 23 may detect whether there is an indicative object and how far away the indicative object is located from a driver's vehicle by measuring a time from when light is emitted to when scattered light is detected. Distribution information on indicative objects obtained with the LiDAR 23 is sent to the external world recognizing section 11.

The navigation device 3 may include the GNSS 31 (Global Navigation Satellite System) and may have a function of mapping a current position of the driver's vehicle to the map and guiding the driver's vehicle along a route to a destination. The position information detected with the GNSS 31 is sent to a driver's vehicle position recognizing section 12 to be described later. The communication device 4 may comprise a narrow range communication section 41 and a mobile communication section 42 and may be able to communicate with an external system, an external device, and other vehicles through a radio communication medium such as a cellular network, a Wi-Fi network, Bluetooth (Registered trademark), or DSRC (Dedicated Short-Range Communication).

The running power generating device 6 may output to drive wheels a driving power (torque) needed for a vehicle to run. The running power generating device 6 may have an internal combustion engine and an engine ECU (Electronic Control Unit) or have a driving motor and a motor ECU and may control the driving power for running in accordance with information sent from a running control section 16 to be described later.

The braking device 7 may be either an electrical servo brake or an electrically controlled hydraulic brake and control a braking force in accordance with information sent from the running control section 16.

The steering device 8 may change a direction of steerable wheels in accordance with either information sent from an autonomous driving control section 15 or a steering angle of a steering wheel.

The vehicle sensor 9 may be a group of sensors for detecting various pieces of information on a state of the vehicle, which includes various sensors for the autonomous driving such as a vehicle speed sensor to detect a vehicle speed, an acceleration sensor to detect an acceleration, a yaw rate sensor to detect an angular velocity about a vertical axis, a magnetic sensor to detect an orientation of the vehicle, and an inclination angle sensor to detect an inclination angle of the vehicle.

The illumination device 18 includes turn signal indicators 181, brake lamps 182, width indicators 183 and head lamps 184.

The meter panel 5 includes not only a speed meter, a tachometer, an odometer, a fuel gauge, and a water temperature meter, but also a traffic sign display portion 105 to indicate a traffic sign that is recognized as information to assist a driver in driving.

Next, a configuration of the vehicle control device 1 is explained.

The vehicle control device 1 may be a processor consisting of one or more CPU (Central Processing Unit) or a hardware device that has an equivalent function to the processor and include a storage device and an ECU (Electronic Control Unit) connected to a communication interface through internal bus lines or a MPU (micro-Processing Unit).

The vehicle control device 1 may perform various functions by the processor executing programs.

The autonomous driving control section 15 may be a control section for having the vehicle autonomously run without a driver performing a driving operation.

The autonomous driving control section 15 may control the running control section 16 in such a manner that the vehicle runs along a travel route prepared based on action plan information 132 stored in the storage section 13.

The action plan information 132 is prepared by an action plan creating section (not shown) based on external world information on indicative objects including an object and a traffic sign that are located around the vehicle and recognized with the external world recognizing section 11, position information that is calculated by the driver's vehicle position recognizing section 12 based on inertial navigation, position information received from the GNSS 31, and precise map information 131 including information on a centerline and border lines of a lane, road information (three-dimensional position information), traffic restriction information and address information.

The running control section 16 controls the vehicle running based on operational instructions from the autonomous driving control section 15 while communicating with the driving power generating device 6, the braking device 7 and the steering device 8.

The driving assistance control section 14 performs transition control between a manual driving mode in which a driver steers, accelerates and decelerates the vehicle and a five-level autonomous driving mode in which the vehicle autonomously steers, accelerates and decelerates itself with an overriding operation or a handover operation.

For instance, the driving assistance control section 14 is checking if a driver holds the steering wheel with his or her hands while the vehicle is in a level 2 autonomous driving mode (driving assistance). Then, if the driving assistance control section 14 detects that the driver keeps hands off the steering wheel over a predetermined time, the driving assistance control section 14 warns a driver to hold the steering wheel or cancels the level 2 autonomous driving mode.

A traffic sign displaying section 10, which is included by the traffic sign displaying device of the embodiment, may be a part of the driving assistance control section 14.

Figure 2:
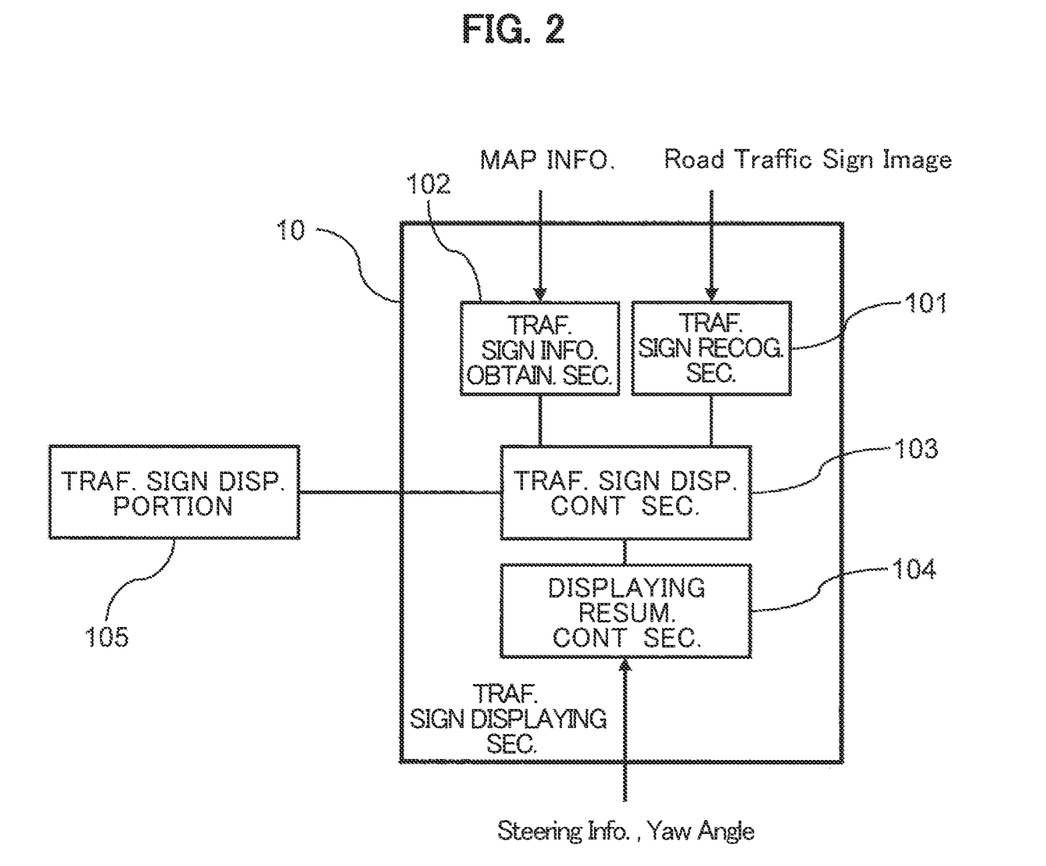
FIG. 2 shows a configuration of the traffic sign displaying device of the embodiment.

Next, a configuration of the traffic sign displaying device is described with reference to FIG. 2.

The traffic sign displaying device of the embodiment includes the traffic sign displaying section 10 that is a part of the driving assistance control section 14 and a traffic sign display portion 105 that the traffic sign displaying section 10 instructs to display a traffic sign.

Hereinafter is explained how a speed limit is displayed as a traffic sign by the traffic sign displaying device of the embodiment.

The traffic sign displaying section 10 consists of a traffic sign recognizing section 101 to recognize a traffic sign information in an image of an area ahead of the vehicle including an image of a traffic sign, a traffic sign information obtaining section 102 to derive traffic sign information associated with the position information of the vehicle from the map information, a traffic sign display control section 103 to send either the traffic sign recognized by the traffic sign recognizing section 101 or the traffic sign obtained by the traffic sign information obtaining section 102 to the traffic sign display portion 105 to have the traffic sign displayed on the traffic sign display portion 105, and a displaying resumption control section 104 to control resuming the traffic sign display control section 103 displaying the traffic sign on the traffic sign display portion 105.

To be specific, the traffic sign recognizing section 101 recognizes as traffic sign information a speed limit indicated by an image of a speed restriction sign that is extracted by the external world recognizing section 11 from an image of an area ahead of the vehicle taken by the camera 21 of the external world sensor 2, the speed restriction sign being installed at a road on which the vehicle is running.

The traffic sign information obtaining section 102 obtains a speed limit in accordance with traffic restriction information for the road on which the vehicle is running based on the map information of the precise map information 131 on a position of the vehicle recognized by the driver's vehicle position recognizing section 12.

The traffic sign display control section 103 compares the speed limit recognized with the camera 21 by the traffic sign recognizing section 101 with the speed limit obtained by the traffic sign information obtaining section 102 and communicates the speed limit to be displayed to the traffic sign display portion 105. The details of this operation are described later.

In addition, the traffic sign display control section 103 communicates the speed limit value to be displayed on the traffic sign display portion 105 to the autonomous driving control section 15 so that ACC (Adaptive Cruise Control) is controlled in accordance with the speed limit value to be displayed on the traffic sign display portion 105.

The displaying resumption control section 104 is a control section to resume displaying the speed limit on the traffic sign display portion 105 based on the steering information on the steering device 8 or the yaw angle detected by the vehicle sensor 9, after the traffic sign display control section 103 stops displaying the speed limit on the traffic sign display portion 105

Figure 3:
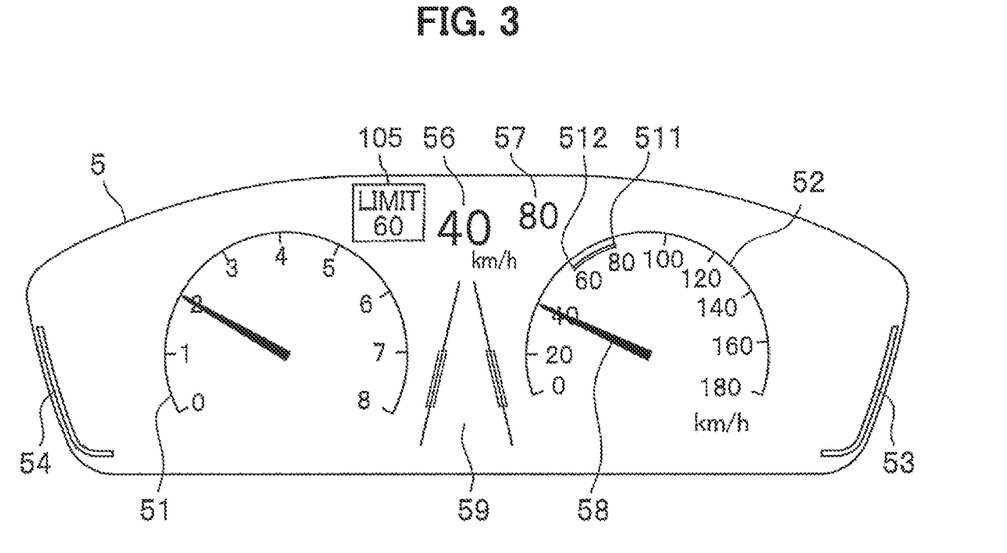
FIG. 3 shows an example of displayed information on a meter panel.

Next, a displayed example on the traffic sign display portion 105 is explained.

FIG. 3 illustrates a meter panel 5 including the traffic sign display portion 105.

The meter panel 5 includes a tachometer 51 to indicate an engine rotation speed, a speed meter 52 to indicate a speed at which the vehicle is running, a fuel gauge 53 to indicate how much fuel is left and a water temperature meter 54 to indicate a temperature of cooling water to cool the engine. In addition, the meter panel 5 includes a running speed value portion 56 to digitally indicate the current speed (for example, 40 km/h) corresponding to a running speed needle 58, a preset speed value portion 57 to digitally indicate an ACC speed (for example, 80 km/h), a state indicating portion 59 for LKAS (Lane Keep Assist System), and the traffic sign display portion 105.

The traffic sign displaying device of the embodiment digitally indicates either the speed limit in the traffic sign recognized by a camera or the speed limit derived from the map information (for example, 60 km/h) on the traffic sign display portion 105, while there is no indication in the traffic sign display portion 105 if the speed limit in the traffic sign recognized by a camera does not match the speed limit derived from the map information. Details will be described later.

In addition, a speed limit exceeding range is indicated in a meter scale of the speed meter 52 with the preset vehicle speed 511 for ACC (for example, 80 km/h) and the speed limit 512 indicated by the traffic sign display portion 105 (for example, 60 km/h). This speed limit exceeding range changes in conjunction with the indication of the traffic sign display portion 105.

Hereinafter, how the traffic sign is displayed by the traffic sign displaying device of the embodiment is explained in detail.

Figure 4:
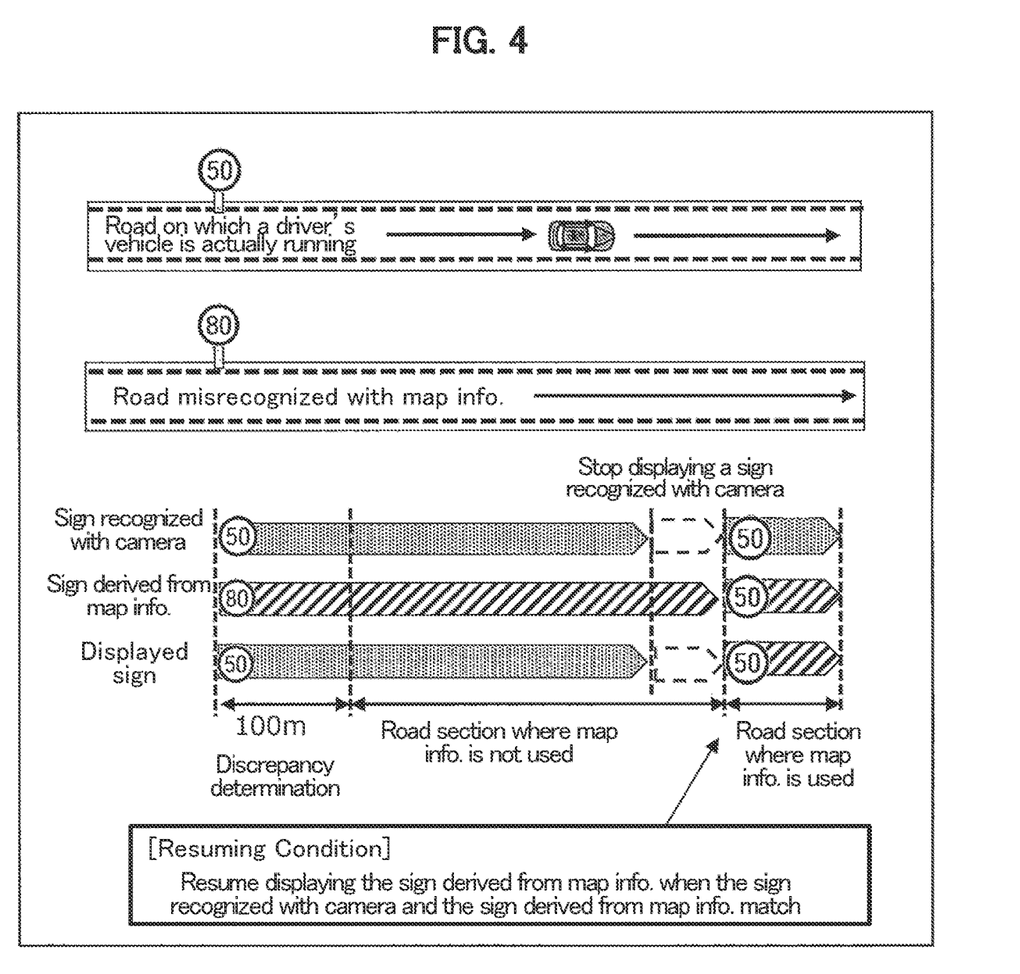
FIG. 4 illustrates how a display control is performed.

FIG. 4 illustrates how the traffic sign is displayed in a case where the driver's vehicle position recognizing section 12 misrecognizes that the vehicle is running on an expressway or a limited highway, although the vehicle is running actually on a side road that extends along the expressway or the limited highway or in a case where there is a speed restriction temporarily in place due to a road construction. The case where the speed restriction is temporarily in place is explained in detail later.

FIG. 4 shows a state of a road (on which the driver's vehicle is actually running) whose traffic signs are recognized by the camera 21, a state of a road (misrecognized with the map information for a road which the driver's vehicle is running) on which the driver's vehicle position recognizing section 12 recognizes the driver's vehicle is running with the map information of the precise map information 131 based on the recognized position of the driver's vehicle, and a state of how the traffic sign displaying device determines the speed limit to be displayed.

To be specific, the road on which the driver's vehicle is running and whose traffic signs are recognized with the camera 21 has a traffic sign (restriction traffic sign) installed, which indicates a maximum allowable speed (speed limit) of 50 km/h, while the road on which the driver's vehicle position recognizing section 12 recognizes the driver's vehicle is running with the map information has a maximum allowable speed (speed limit) of 80 km/h.

In the case as illustrated in FIG. 4, the traffic sign displaying device of the embodiment displays the speed limit as a traffic sign based on a comparison between the speed limit value recognized with the camera and the speed limit value derived from the map information (map output) as follows.

The traffic sign display control section 103 compares the speed limit value (50 km/h) recognized by the traffic sign recognizing section 101 based on the image taken by the camera 21 with the speed limit value (80 km/h) derived from the map information by the traffic sign information obtaining section 102 based on the recognized position of the driver's vehicle.

The traffic sign display control section 103 determines that the compared results do not match and communicates the speed limit value recognized with the camera 21 in the traffic sign to the traffic sign display portion 105 and has the traffic sign display portion 105 display this speed limit value as the traffic sign.

This determination to preferentially use the speed limit value with the camera is based on priority for the actual scene. As a result, the traffic sign can be displayed, which appropriately addresses the misrecognition of the position of the driver's vehicle in the map, a temporary speed restriction due to a road construction or a delay in the speed restriction information of the map information being updated.

In addition, a vehicle, to which the map information (speed restriction information) is sent through the network, can display the speed limit as the traffic sign even when the vehicle cannot receive the map information due to a network trouble.

In the case as illustrated in FIG. 4, the traffic sign display control section 103 performs a 100 m discrepancy determination. To be specific, the traffic sign display control section 103 determines that there is a discrepancy between the speed limit values if the speed limit value recognized with the camera does not match the speed limit value derived from the map information over a period over which the vehicle runs a predetermined distance (100 m).

In the case as illustrated in FIG. 4, the traffic sign display portion 105 displays the speed limit value from the road traffic sign recognized with the camera from the beginning of the period of the 100 m discrepancy determination. However, if the speed limit values become equal to each other while the 100 m discrepancy determination period is under way, the traffic sign display portion 105 may display the speed limit value derived from the map output. As is understood, the traffic sign display portion 105 may display the speed limit value recognized with the camera after the discrepancy determination ends.

Since the traffic sign displaying device of the embodiment performs the discrepancy determination over the predetermined distance, the traffic sign displaying device, for instance, can manage to avoid displaying a traffic sign of a speed limit misrecognized with the map information when the vehicle is running on a low-speed lane between a couple of junctions that are not far away from each other, at each of which roads with different speed limits join together.

The traffic sign display control section 103 has the traffic sign display portion 105 display the speed limit value from the road traffic sign recognized with the camera as the traffic sign and stops displaying the traffic sign after the vehicle runs a predetermined distance (several hundreds meters~one thousand and several hundreds meters) or over a predetermined time. In this way, the traffic sign display portion 105 does not display the speed limit misrecognized with the map information and does not give wrong information on the speed limit to a driver.

The traffic sign display control section 103 resumes displaying the speed limit value derived from the map information when the traffic sign display control section 103 is informed by the displaying resumption control section 104 that a predetermined resuming condition is met after the speed limit value recognized by the traffic sign recognizing section 101 with the camera 21 matches the speed limit value derived by the traffic sign information obtaining section 102 from the map information. To be specific, when the position of the driver's vehicle is correctly recognized, then the driver's vehicle position recognizing section 12 recognizes that the driver's vehicle is running on the side road and the speed limit value derived from the map information becomes equal to the speed limit value recognized with the camera.

Figure 5:
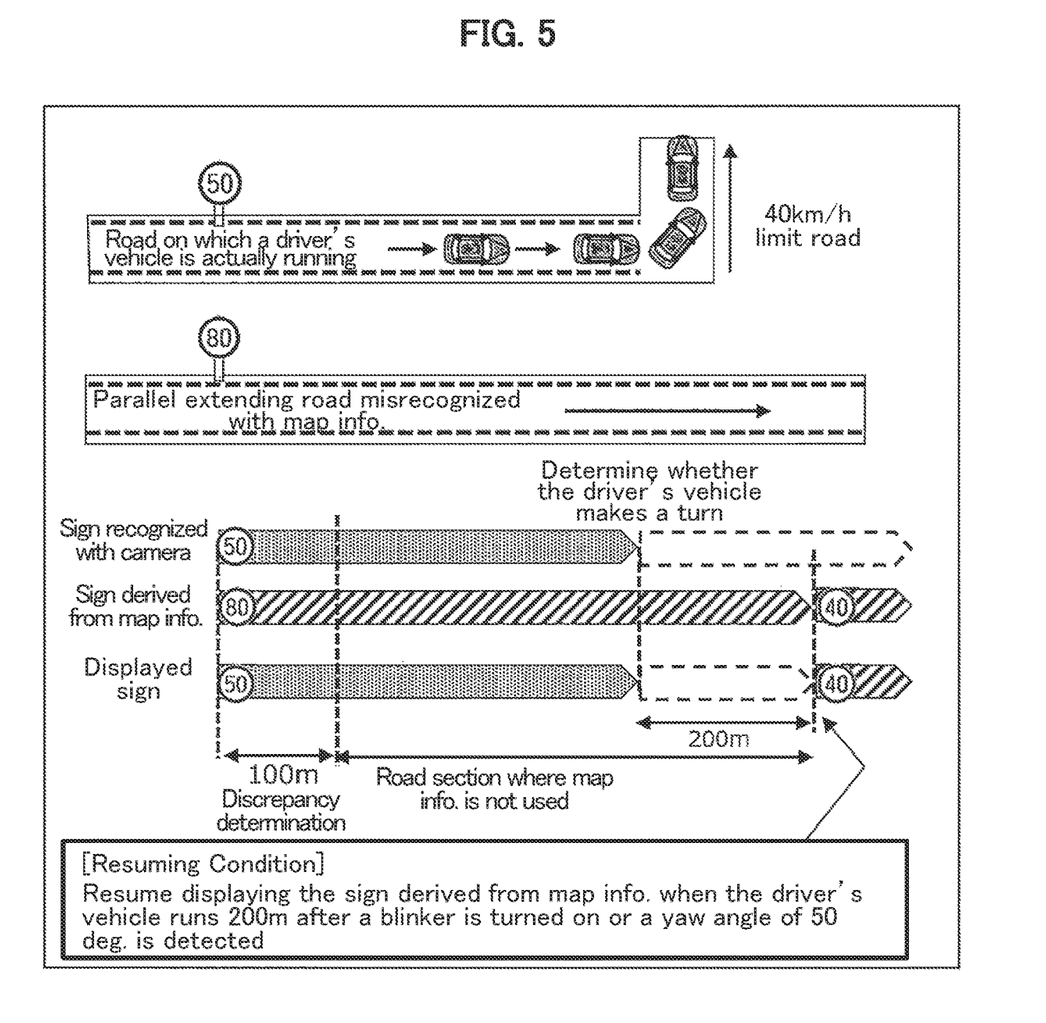
FIG. 5 illustrates another resuming condition for resuming displaying the traffic sign.

Next, with reference to FIG. 5, another example of the resuming condition for resuming displaying the speed limit value derived from the map information, which is different from the resuming condition as explained in FIG. 4.

FIG. 5 shows a case in which the driver's vehicle position recognizing section 12 misrecognizes that the vehicle is running on an expressway or a limited highway when the vehicle is actually running on a side road (parallel extending road) along the expressway or the limited highway, as is the case with FIG. 4. However, in this case, the side road on which the vehicle is running extends bending away from the expressway or the limited highway after extending along it, which is different from the side road in FIG. 4.

The procedure until the traffic sign display control section 103 communicates the speed limit value recognized with the camera to the traffic sign display portion 105 to display the speed limit as the traffic sign is the same as that in FIG. 4 and not described again.

When the displaying resumption control section 104 detects a blinker as a directional indicator 181 being turned on or the yaw rate sensor of the vehicle sensor 9 detects a turn of the vehicle by an angle equal to or larger than 50 degrees, the displaying resumption control section 104 determines that the vehicle is making a turn to the right or the left and informs the traffic sign display control section 103 of the vehicle making a turn.

As a result, the traffic sign display control section 103 stops displaying the traffic sign. Then, the displaying resumption control section 104 resumes displaying the speed limit value based on the map information after the vehicle runs 200 m, determining that the driver's vehicle position recognizing section 12 correctly recognizes the position of the vehicle in the map.

That is, the traffic sign display control section 103 resumes displaying the speed limit value derived from the map information on the condition that the vehicle is steered or makes a turn to the right or the left.

Next, the resuming condition for a case where the speed limit value recognized with the camera and the speed limit value derived from the map information become unequal to each other due to a temporary speed restriction is described with reference to FIG. 6.

Figure 6:
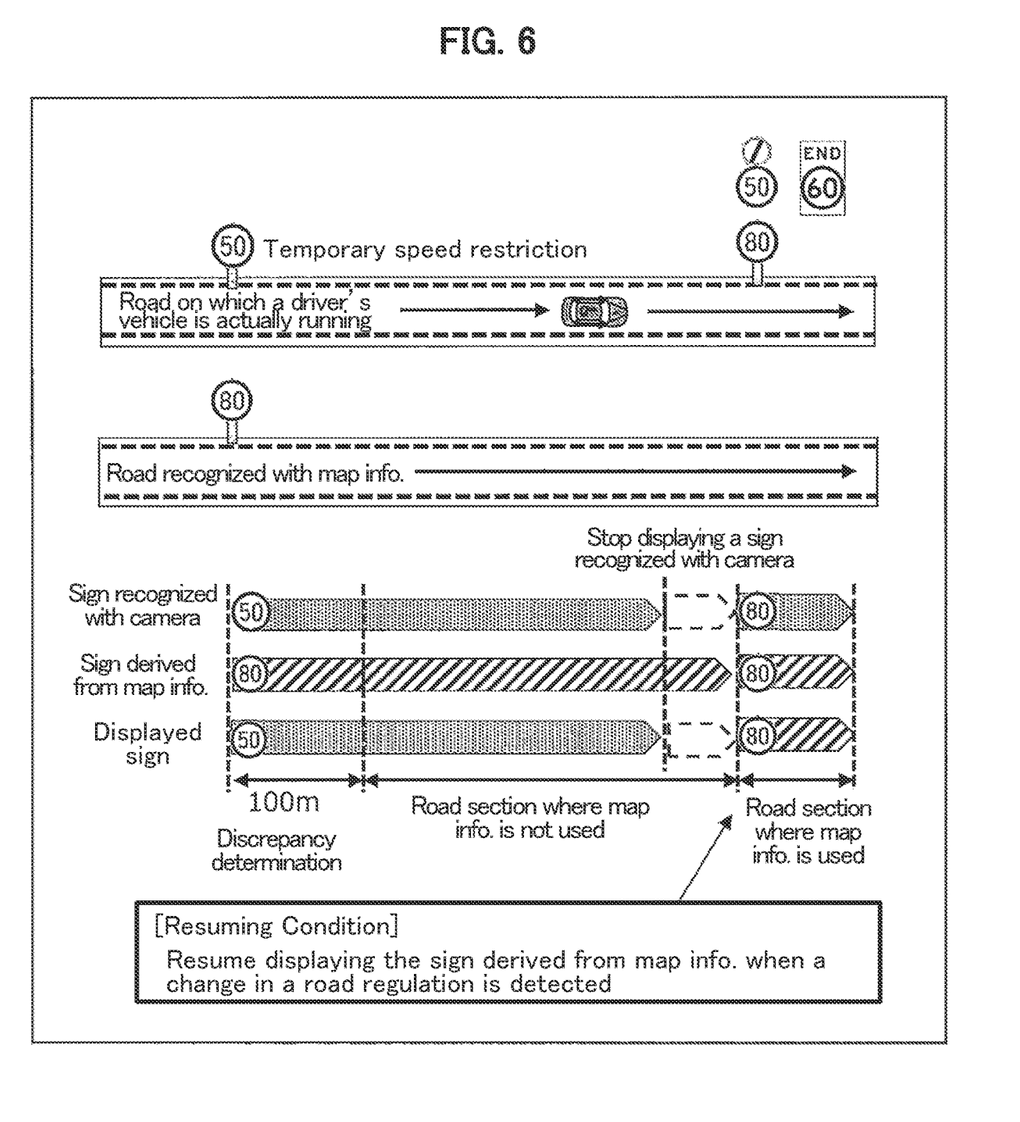
FIG. 6 illustrates an example for a road at which a supplementary traffic sign is installed.

FIG. 6 shows a case where the vehicle is running on a road section whose speed limit is 80 km/h according to the map information and temporarily restricted to 50 km/h due to a road construction.

At the end of the road section where the road construction is under way, there is a supplemental road sign indicating that the road construction section ends or a traffic sign indicating the maximum allowable speed of 80 km/h that is a default speed limit.

The control procedure in this case includes the same procedure as the control procedure, as illustrated in FIG. 4, until the traffic sign display control section 103 stops displaying the traffic sign after the vehicle runs a predetermined distance (several hundreds to one thousand and several hundred meter) or over a predetermined time with the traffic sign display portion 105 displaying the speed limit recognized with the camera that the traffic sign display control section 103 communicates as the traffic sign to the traffic sign display portion 105 due to the discrepancy between the speed limit value recognized with the camera and the speed limit value derived from the map information, and the duplicate description is skipped.

The traffic sign display control section 103 resumes displaying the speed limit value derived from the map information when the displaying resumption control section 104 informs the traffic sign display control section 103 that a following resumption condition is met. The resuming condition for the traffic sign display control section 103 in this case is that the traffic sign recognizing section 101 recognizes the supplemental road sign indicating that the speed restriction section ends or that the traffic sign recognizing section 101 recognizes the road traffic sign indicating a maximum allowable speed that is equal to the speed limit value derived by the traffic sign information obtaining section 102 from the map information.

That is, the traffic sign display control section 103 resumes displaying the traffic sign if the displaying resumption control section 104 detects a change in the speed limit as a road regulation after the traffic sign display portion 105 stops displaying the traffic sign.

In the case as illustrated in FIG. 6, the supplemental road sign is recognized after displaying the traffic sign is stopped. However, if the supplemental road sign indicating that speed restriction section ends is recognized while the traffic sign is being displayed, that is, the vehicle is running the predetermined distance (several hundreds to one thousand and several hundreds meters) or over the predetermined time, the traffic sign display control section 103 may immediately stop displaying the speed limit value recognized with the camera as the traffic sign and resumes displaying the speed limit value derived from the map information as the traffic sign.

Figure 7:
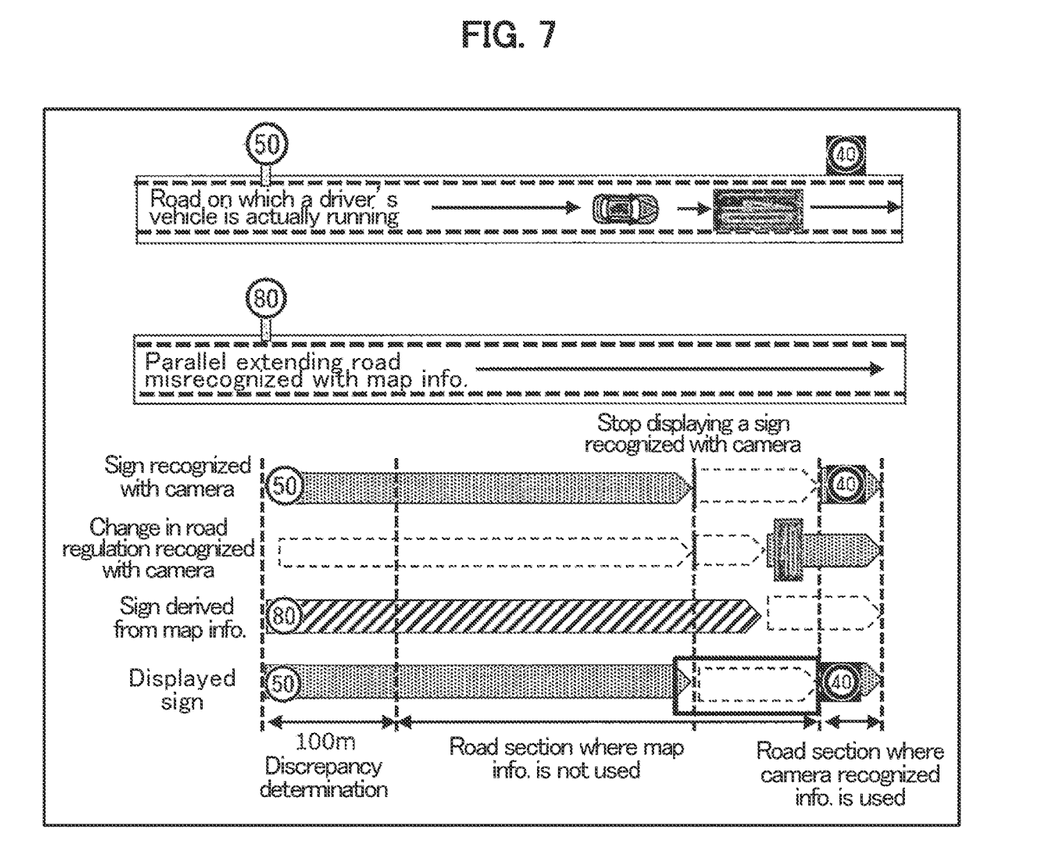
FIG. 7 illustrates an example for a road on which there is a road surface traffic indication.

Next, with reference to FIG. 7, a case where the vehicle is running on a road on which there is a road surface traffic indication to supplement the road traffic sign is described.

FIG. 7 shows a case in which a road traffic sign and a road surface traffic indication both of which indicate the speed limit of 40 km/h are present on the side road as shown in FIG. 4.

If the traffic sign display control section 103 recognizes a speed limit from a road surface traffic indication with the camera and subsequently recognizes a speed limit from a speed limit road traffic sign with the camera when the traffic sign is kept stopped from being displayed, the traffic sign display control section 103 displays the speed limit value of the road traffic sign recognized with the camera on the traffic sign display portion 105 to resume displaying the traffic sign.

To be specific, the displaying resumption control section 104 compares the speed limit value recognized with the camera with the speed limit value derived from the map information to determine whether the resuming condition for displaying the traffic sign is met, when the speed limit is recognized from the road surface indication with the camera and the speed limit is recognized from the road traffic sign with the camera as well. If the displaying resumption control section 104 determines that the resuming condition is met with the speed limit values to be compared being equal to each other (not shown in FIG. 7), the traffic sign display control section 103 is informed of the result and resumes displaying the speed limit value (40 km/h) as the traffic sign because the position of the driver's vehicle is not misrecognized any more.

When the displaying resumption control section 104 determines that the resuming condition is not met with the speed limit values to be compared being still not equal to each other, then the displaying resumption control section 104 determines whether there has been a change in the speed limit value recognized with the camera by the traffic sign recognizing section 101, as shown in FIG. 7. If the change has been recognized by the traffic sign recognizing section 101, that is, if the traffic sign recognizing section 101 has recognized a change in the speed limit as a road regulation, the traffic sign display control section 103 resumes displaying a traffic sign of the speed limit value recognized with the camera.

In the case as shown in FIG. 7, the traffic sign recognizing section 101 recognizes the speed limit from the road surface traffic indication before the traffic sign recognizing section 101 recognizes the speed limit from the road traffic sign. The traffic sign recognizing section 101 prioritizes the recognition of the road traffic sign over the recognition of the road surface traffic indication.

To be more specific about the case as shown in FIG. 7, since the traffic sign recognizing section 101 recognizes the speed limit from the road traffic sign within a predetermined time after recognizing the speed limit from the road surface indication, the traffic sign recognizing section 101 prioritizes the speed limit from the road traffic sign over the speed limit from the road surface traffic indication.

In the cases as shown in FIG. 4 to FIG. 7, the speed limit value recognized from the road traffic sign is compared with the speed limit value recognized from the map information. However, in addition to this comparison, the speed limit value recognized from the road surface indication may be compared with the speed limit value derived from the map information.

The traffic sign displaying device of the embodiment displays the traffic sign according to the priority order of the road traffic sign over the road surface traffic indication over the map information.

Next, an operation flow of the traffic sign displaying device of the embodiment is explained with reference to FIG. 8.

The following control procedure explains one cycle of the operation of the repeatedly performed operations.

In Step S81, the traffic sign information obtaining section 102 obtains a speed limit that is a piece of road sign information derived from the map information of the road on which the vehicle is determined to be running based on the vehicle position information and the traffic sign recognizing section 101 receives a speed limit recognized with the camera from an image of a road traffic sign included in an image of an area ahead of the vehicle.

In Step S82, the traffic sign display control section 103 determines if the speed limit derived from the map information and the speed limit recognized with the camera, both of which are obtained in Step S81, match. If the speed limit value from the map information matches the speed limit value recognized with the camera (Yes in Step S82), the control procedure goes to Step S810, and if not (No in Step S82), the control procedure goes to Step S83.

In Step S83, the traffic sign display control section 103 communicates the speed limit value recognized with the camera to the traffic sign display portion 105 and displays the speed limit value recognized with the camera from the road traffic sign.

In Step S84, the traffic sign display control section 103 determines if the driver's vehicle has run a predetermined distance after the traffic sign display control section 103 determines that the speed limits do not match in Step S82.

If the driver's vehicle determines that the driver's vehicle has not run the predetermined distance (No in Step S84), the control procedure goes back to Step S81, the traffic sign information obtaining section 102 again obtains the speed limit value derived from the map information and the speed limit value recognized with the camera, and the traffic sign display control section 103 determines whether these speed limit values match (Step S82) again.

On the contrary, if the driver's vehicle has run the predetermined distance (Yes in Step S84) after Step S82, the control procedure proceeds to Step S85 to display a traffic sign of the speed limit recognized with the camera, which is the traffic sign to be displayed when the traffic sign (the speed limit from the map) derived from the map information and the traffic sign (speed limit recognized with the camera) recognized with the camera do not match.

In Step S85, the traffic sign display control section 103 continues to display the speed limit recognized with the camera on the traffic sign display portion 105 over a predetermined distance or over a predetermined time and then stops displaying the traffic sign on the traffic sign display portion 105. Subsequently, the control procedure proceeds to Step S86 and the traffic sign display control section 103 is performing a resuming process for resuming displaying a traffic sign.

In Step S86, the traffic sign display control section 103 obtains the speed limit value derived from the map and the speed limit value recognized with the camera. Then the control procedure goes to Step S87.

In Step S87, the traffic sign display control section 103 compares the speed limit value obtained from the map and the speed limit value recognized with the camera and determines whether these speed limit values match. If they match, the resuming condition is met and the control procedure goes to Step S810 (Yes in Step S87). If they do not match, the control procedure goes to Step S88 (No in Step S87).

In Step S88, the traffic sign display control section 103 determines whether the displaying resumption control section 104 detects the blinker being turned on or the yaw rate becoming a predetermined angle with the yaw rate sensor of the vehicle sensor 9 in order to determine whether the driver's vehicle makes a turn. If the displaying resumption control section 104 detects the driver's vehicle making a turn to the right or the left (Yes in Step S88), the traffic sign display control section 103 determines that the resuming condition is met and has the control procedure proceed to Step S810 after the driver's vehicle runs a predetermined distance. If the displaying resumption control section 104 does not detect the driver's vehicle making a turn to the right or the left (No in Step S88), the control procedure proceeds to Step S89.

In the example as illustrated in FIG. 5, displaying the speed limit derived from the map information is resumed when the vehicle making a turn is detected while the vehicle is running a predetermined distance or over a predetermined time after the traffic sign display control section 103 determines that there is a discrepancy in the speed limit value.

Figure 8:
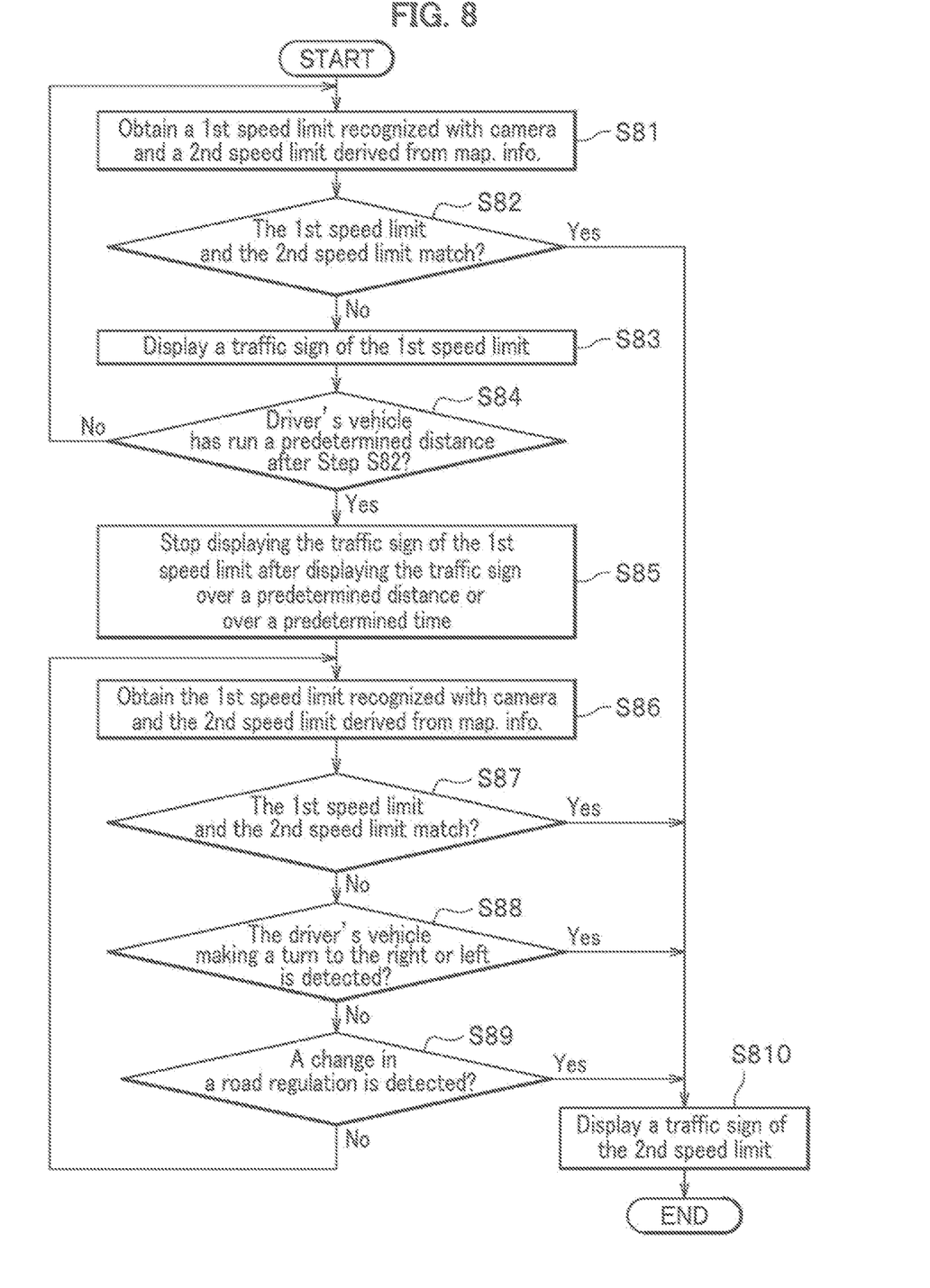
FIG. 8 describes a flow chart of a display control operation performed by the traffic sign displaying device.

However, as above described with the flow chart in FIG. 8, displaying the speed limit derived from the map information may be resumed if the vehicle making a turn is detected after displaying the traffic sign is stopped after the vehicle has run a predetermined distance or over a predetermined time.

In Step S89, the traffic sign display control section 103 checks whether a change in a road regulation is detected to determines if the resuming condition is met. To be specific, if the traffic sign recognizing section 101 recognizes a road traffic sign that is a supplementary traffic sign indicating an end of a road section where a special speed limit applies or if the traffic sign recognizing section 101 recognizes a road traffic sign indicating a maximum allowable speed that corresponds to a speed limit obtained by the traffic sign information obtaining section 102, the traffic sign display control section 103 determines that there is a change in a road regulation.

If the traffic sign display control section 103 determines that there is a change in a road regulation (Yes in Step S89), the control procedure proceeds to Step S810. If not (No in Step S89), the control procedure goes back to Step S86 and the traffic sign display portion 105 is performing the resuming process for resuming displaying a traffic sign again.

In Step S810, the traffic sign display control section 103 communicates the speed limit value to the traffic sign display portion 105 to display a traffic sign of the speed limit value derived from the map information.

According to the traffic sign display device of the embodiment as described, when there is a discrepancy between the speed limit recognized from the traffic sign recognized by the camera and the speed limit derived from the map information, the traffic sign is not displayed until the predetermined condition is met after the driver's vehicle runs a predetermined distance or over a predetermined time with the speed limit recognized from the road traffic sign by the camera being preferentially displayed. As a result, the erroneous traffic sign is hardly displayed, and the passenger is notified of appropriate traffic signs.

The traffic sign displaying device of the embodiment as described may be applied not only to the maximum allowable speed (speed limit), but also to a regulation sign for no stopping allowed and a warning sign for a decrease in lanes.

In addition, although the traffic sign displaying device of the embodiment as described displaying the speed limit recognized by the camera when there is a discrepancy between the speed limit derived from the map information (sign information) and the speed limit recognized with the camera (sign information) is explained, the traffic sign displaying device may display the speed limit derived from the map information while the driver's vehicle is running a predetermined distance or over a predetermined time.

What is claimed is:

1. A traffic sign displaying device comprising a processor including;
   a traffic sign recognizing section for recognizing first traffic sign information on a traffic sign included in an image of an area ahead of a vehicle;
   a traffic sign information obtaining section for obtaining from map information second traffic sign information on a traffic sign of a road on which the vehicle is determined to be running based on position information on the vehicle;
   a traffic sign display portion for displaying either the first traffic sign information recognized by the traffic sign recognizing section or the second traffic sign information obtained by the traffic sign information obtaining section to a passenger in the vehicle; and
   a traffic sign display control section for controlling the traffic sign display portion to display traffic sign information that is either the first traffic sign information or the second traffic sign information,
   wherein if the first traffic sign information recognized by the traffic sign recognizing section does not match the second traffic sign information obtained by the traffic sign information obtaining section, the traffic sign display control section stops displaying the traffic sign information on the traffic sign display portion after the vehicle runs a predetermined distance or over a predetermined time with the traffic sign display control section displaying on the traffic sign display portion either the first traffic sign information recognized by the traffic sign recognizing section or the second traffic sign information obtained by the traffic sign information obtaining section; and
   wherein the processor further includes a displaying resumption control section for having the traffic sign display control section resume displaying the traffic sign information if the displaying resumption control section detects the vehicle being steered or making a turn to the right or the left after the traffic sign display control section stops displaying the traffic sign information on the traffic sign display portion.

2. The traffic sign displaying device as claimed in claim 1, wherein the traffic sign information is a restriction indication for a speed limit.

3. The traffic sign displaying device as claimed in claim 1, wherein the traffic sign display control section displays the first traffic sign information recognized by the traffic sign recognizing section, if the first traffic sigh information recognized by the traffic sign recognizing section does not match the second traffic sign information obtained by the traffic sign information obtaining section.

4. The traffic sign displaying device as claimed in claim 1, wherein the processor further includes the displaying resumption control section for having the traffic sign display control section resume displaying the traffic sign information if the first traffic sign information matches the second traffic sign information after the traffic sign display control section stops displaying the traffic sign information on the traffic sign display portion.

5. A traffic sign displaying device comprising a processor including;
   a traffic sign recognizing section for recognizing first traffic sign information on a first traffic sign included in an image of an area ahead of a vehicle;
   a traffic sign information obtaining section for obtaining second traffic sign information from map information, the second traffic sign information being traffic sign information on a second traffic sign of a road on which the vehicle is determined to be running based on position information on the vehicle;
   a traffic sign display portion for displaying either the first traffic sign information recognized by the traffic sign recognizing section or the second traffic sign information obtained by the traffic sign information obtaining section to a passenger in the vehicle; and
   a traffic sign display control section for controlling the traffic sign display portion to display traffic sign information that is either the first traffic sign information or the second traffic sign information,
   wherein if the first traffic sign information recognized by the traffic sign recognizing section does not match the second traffic sign information obtained by the traffic sign information obtaining section, the traffic sign display control section stops displaying the traffic sign information on the traffic sign display portion after the vehicle runs a predetermined distance or over a predetermined time with the traffic sign display control section displaying on the traffic sign display portion either the first traffic sign information recognized by the traffic sign recognizing section or the second traffic sign information obtained by the traffic sign information obtaining section; and wherein the processor further includes a displaying resumption control section for having the traffic sign display control section resume displaying the traffic sign information, and the traffic sign information obtaining section obtains second traffic sign information of the second traffic sign from the map information and the displaying resumption control section has the traffic sign display control section resume displaying the second traffic sign information if the displaying resumption control section detects a change in a road regulation indicated by the first traffic sign recognized by the traffic sign recognizing section after the traffic sign display control section stops displaying the traffic sign information on the traffic sign display portion.

6. The traffic sign displaying device as claimed in claim 5, wherein the first traffic sign information and the second traffic sign information are a restriction indication for a speed limit.

7. The traffic sign displaying device as claimed in claim 5, wherein the traffic sign display control section displays the first traffic sign information recognized by the traffic sign recognizing section, if the first traffic sign information recognized by the traffic sign recognizing section does not match the second traffic sign information obtained by the traffic sign information obtaining section.

8. The traffic sign displaying device as claimed in claim 5, wherein the processor further includes the displaying resumption control section for having the traffic sign display control section resume displaying the traffic sign information if the first traffic sign information matches the second traffic sign information after the traffic sign display control section stops displaying the traffic sign information on the traffic sign display portion.

* * * * *